Feb. 12, 1952     F. R. BROOKS ET AL     2,585,367
SELF-LUBRICATING VEHICLE SPRING
Filed July 2, 1948
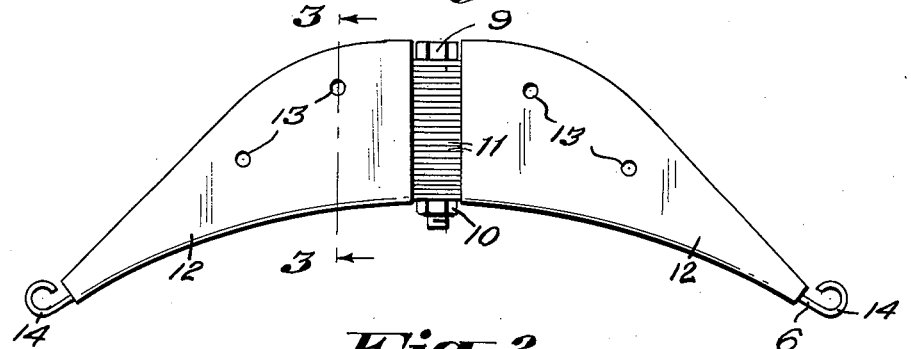
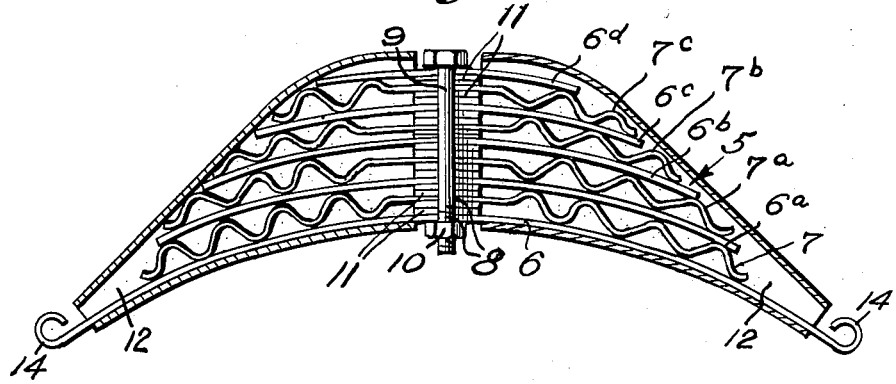
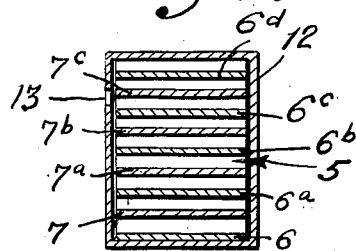
Inventors:
Firman R. Brooks
Alfred J. Turner
By John N. Randolph
Attorney

Patented Feb. 12, 1952

2,585,367

UNITED STATES PATENT OFFICE 2,585,367

SELF-LUBRICATING VEHICLE SPRING

Firman R. Brooks and Alfred J. Turner, Tucson, Ariz., assignors of ten per cent to Leonard M. Shiebly Application July 2, 1948, Serial No. 36,656

2 Claims. (Cl. 267—50)

This invention relates to an improved construction of vehicle spring which is so constructed to provide a means to better and more completely lubricate the leaves of the spring for eliminating undue friction and to promote greater flexibility and prevent seizure of the spring leaves.

More particularly, it is an aim of the present invention to provide a leaf-type spring having intermediate lubricating leaves for retaining a constant supply of a non-fluid lubricant and by means of which the lubricant is maintained in constant contact with the contacting portions of the spring leaves and lubricating leaves due to the continual flexing action of the two groups of leaves and which results in changes in the arc of travel of the leaves for maintaining an ample supply of the lubricant on all of the contacting points of the leaves.

Various other objects and advantages of the invention will hereinafter become more fully apparent from the following description of the drawing, illustrating a presently preferred embodiment thereof, and wherein:

Figure 1 is a side elevational view showing a vehicle spring constructed in accordance with the invention and enclosed by two halves of the conventional spring cover;

Figure 2 is a longitudinal, substantially central sectional view of the spring as illustrated in Figure 1 but showing the spring leaves in side elevation, and Figure 3 is a cross sectional view taken substantially along a plane as indicated by the line 3—3 of Figure 1.

Referring more specifically to the drawing, the improved vehicle spring in its entirety is designated generally 5 and is composed of a plurality of spring leaves 6, 6a, 6b, 6c and 6d and also a plurality of leaves 7, 7a, 7b and 7c which are likewise spring leaves but which differ from the leaves 6, 6a, 6b, 6c and 6d and will accordingly hereafter be referred to as lubricating leaves. The spring leaves and lubricating leaves are all longitudinally bowed in the same direction and as clearly illustrated in Figure 2. The lubricating leaf 7 is interposed between the spring leaves 6 and 6a, the lubricating leaf 7a between the leaves 6a and 6b, the lubricating leaf 7b between the leaves 6b and 6c, and the lubricating leaf 7c between the leaves 6c and 6d. Said leaves and lubricating leaves are provided with aligned apertures 8 intermediate of the ends thereof for receiving the shank of a bolt 9 which extends through the aperture 8 of each of the spring leaves and lubricating leaves and which is provided with a threaded shank carrying a nut 10 for detachably connecting said leaves intermediate of their ends. Either the lubricating leaves or the spring leaves, preferably the former may be provided with thickened central portions around the openings 8 thereof or spacing washers may be interposed between said intermediate portions of the spring leaves and lubricating leaves as indicated at 11 for spacing said intermediate portions from one another.

As clearly illustrated in Figure 2, the lubricating leaves 7, 7a, 7b and 7c are provided with undulating end portions which contact the spring leaves at spaced points only and the width of which undulating portions is substantially equal to the width of the intermediate portion of the lubricating leaf combined with the thickness of the washers or spacing members 11 disposed on either side thereof.

It will accordingly be readily apparent that the spring leaves are held in spaced relationship to one another by the undulating ends of the lubricating leaves and the spacing elements 11 so as to afford unoccupied spaces between the spring leaves and lubricating leaves. The spring 5 is adapted to be enclosed in a conventional spring cover formed of the corresponding halves 12, each of which halves is provided with lubricating openings 13 through which a lubricant, not shown, of a non-fluid type such as a grease may be applied to the spring 5 between certain of the spring leaves and lubricating leaves.

The vehicle spring 5 is adapted to be mounted in a conventional manner and for this purpose the main spring leaf 6 is provided with eyes 14 at the ends thereof. In operation, the arc of the spring 5 will be varied by its flexing action which will cause the undulating ends of the lubricating spring leaves to be extended and retracted to a certain extent longitudinally with respect to the spring leaves 6, 6a, 6b, 6c and 6d so that the points of contact of the lubricating leaves with the spring leaves will be varied thereby causing the lubricant to be applied along these contacting surfaces. Further, the undulating end portions of the lubricating leaves will be flattened to a certain extent when pressure is applied to the spring for producing and exuding force upon the lubricant causing it to be conveyed longitudinally relatively to the spring leaves and lubricating leaves thereby assuring a substantially uniform lubrication of the spring. As clearly illustrated in Figure 2, it will be noted that the contacting points of the lubricating leaves with the spring leaves are substantially in transverse alignment.

It will also be noted that the top and bottom leaves of the spring 5 are spring leaves so that the lubricating leaves in each instance are disposed between two spring leaves.

Various modifications and changes are contemplated and may obviously be resorted to, without departing from the spirit or scope of the invention as hereinafter defined by the appended claims.

We claim as our invention;

1. A vehicle spring of the leaf type comprising a plurality of elongated spring leaves and a plurality of elongated resilient lubricating leaves interposed between the spring leaves, said lubricating leaves having substantially flat intermediate portions and complementary end portions of undulating form each providing staggeredly arranged longitudinally spaced portions in contact with the spring leaves disposed on either side thereof and providing a plurality of unoccupied spaces between the spring leaves and lubricating leaves adapted to contain a non-fluid lubricant, and means extending through and detachably connecting the intermediate portions of the spring leaves and lubricating leaves, said flat intermediate portion of each lubricating leaf being disposed between and spaced from the spring leaves disposed on either side of said lubricating leaf.

2. A vehicle spring as in claim 1, and spacing elements interposed between said flat intermediate portions of the lubricating leaves and the contiguous portions of the spring leaves.

ALFRED J. TURNER.
FIRMAN R. BROOKS.

REFERENCES CITED

The following references are of record in the file of this patent:

UNITED STATES PATENTS

| Number | Name | Date |
|---|---|---|
| 1,256,124 | Gelling | Feb. 12, 1918 |
| 1,624,683 | Skok | Apr. 12, 1927 |
| 1,890,853 | Howard | Dec. 13, 1932 |
| 2,047,802 | Schilde | July 14, 1936 |